Aug. 19, 1941.    J. Q. SHERMAN    2,252,735
STRIP FEEDING AND SEVERING APPARATUS
Original Filed Dec. 14, 1936     8 Sheets-Sheet 2

John Q. Sherman
DECEASED
Katherine M. Sherman
William C. Sherman
Wellmore B. Turner
EXECUTORS
By 
ATTORNEY Aug. 19, 1941.   J. Q. SHERMAN   2,252,735
STRIP FEEDING AND SEVERING APPARATUS
Original Filed Dec. 14, 1936   8 Sheets-Sheet 4

JOHN Q. SHERMAN
DECEASED
KATHERINE M. SHERMAN
WILLIAM C. SHERMAN
WELLMORE B. TURNER
EXECUTORS

ATTORNEY

Aug. 19, 1941. J. Q. SHERMAN 2,252,735
STRIP FEEDING AND SEVERING APPARATUS
Original Filed Dec. 14, 1936  8 Sheets-Sheet 5

JOHN Q. SHERMAN
DECEASED
KATHERINE M. SHERMAN
WILLIAM C. SHERMAN
WELLMORE B. TURNER
EXECUTORS

ATTORNEY

Aug. 19, 1941.  J. Q. SHERMAN  2,252,735
STRIP FEEDING AND SEVERING APPARATUS
Original Filed Dec. 14, 1936   8 Sheets-Sheet 6

JOHN Q. SHERMAN
DECEASED
KATHERINE M. SHERMAN
WILLIAM C. SHERMAN
WELLMORE B. TURNER
EXECUTORS

ATTORNEY

Aug. 19, 1941.  J. Q. SHERMAN  2,252,735
STRIP FEEDING AND SEVERING APPARATUS
Original Filed Dec. 14, 1936   8 Sheets-Sheet 7

Fig.17.

JOHN Q. SHERMAN
DECEASED
KATHERINE M. SHERMAN
WILLIAM C. SHERMAN
WELLMORE B. TURNER
EXECUTORS

By A. C. Walker
ATTORNEY

Patented Aug. 19, 1941

2,252,735

UNITED STATES PATENT OFFICE 2,252,735

STRIP FEEDING AND SEVERING APPARATUS

John Quirk Sherman, deceased, late of Dayton, Ohio, by Katherine M. Sherman, William C. Sherman, and Wellmore B. Turner, executors, Dayton, Ohio Original application December 14, 1936, Serial No. 115,804. Divided and this application September 9, 1939, Serial No. 294,199

23 Claims. (Cl. 164—68)

This invention relates to printing apparatus, and more particularly to automatic mechanism for printing form letters, circulars and the like, employing therefor continuous web or series-connected stationery which, after the printing operation, is automatically subdivided into successive sheets.

The present apparatus is designed for use in mercantile and industrial establishments for rapidly multigraphing letters, bills and circulars for which continuous web printed stationery in roll or packet form shall have been previously prepared, although it may be employed for general type printing of hand bills, circulars and forms.

The web of stationery is preferably pre-printed with a succession of letterheads at spaced intervals, forms or other indicia, in predetermined relation with which successive letter print impressions are to be effected.

A continuously rotating drum carries the printing type, which may be either directly inked or operate through an overlying inked ribbon to effect an impression in a manner similar to the well-known multigraphing machines. While the printing cylinder, of which only a small portion of the periphery may be occupied by printing type, rotates continuously, the paper feeding mechanism is operated intermittently through step-by-step movement, the length of the steps being variable in accordance with the size of the desired printed sheet. Paper feed devices of positive character are employed, which preferably, though not necessarily, are of the pin wheel type, the pins of which progressively engage in spaced marginal holes in the paper web. Subsequently to the printing operation the punched margins of the printed web are trimmed off and the web is transversely cut intermediate succeeding impressions into printed sheets.

The object of the invention is to simplify the construction as well as the means and mode of operation of continuous web printing apparatus whereby it will not only be cheapened in construction, but will be more efficient in operation, automatic in action, rapid, accurate and uniform in production of printed material, and unlikely to get out of repair.

A further object of the invention is to provide an improved form of differential actuating means for the printing cylinder and the paper web feeding apparatus whereby the paper is advanced in unison with the rotation of the printing cylinder during the impression making interval, whether such be long or short, and be given further advance movement either in advance or subsequent to the impression contact of the cylinder, the extent of such advance movement being entirely independently of the movement of the cylinder, to afford a sheet length of predetermined extent.

A further object of the invention is to provide in combination with such printing apparatus a positive feed mechanism for the paper web and to provide slitting means for removing marginal portions of the web employed for feeding purposes subsequently to the printing operation.

A further object of the invention is to provide a compact, inexpensive apparatus adapted for use in commercial and mercantile establishments and which may be operated by unskilled persons.

With the above primary and other incidental objects in view as will more fully appear in the specification, the invention consists of the features of construction, the parts and combinations thereof and the mode of operation, or their equivalents, as hereinafter described and set forth in the claims.

Referring to the accompanying drawings, wherein are shown the preferred but obviously not the only form of embodiment of the invention, Fig. 6 is a detail view of the chain belt paper feed device. Figs. 7 and 8 are top and side elevations of the paper feed chain. Figs. 12 and 13 are perspective views illustrating the successive operations performed upon the paper web, Fig. 12 illustrating the paper punched for pin wheel or chain feeding operation, while Fig. 13 illustrates the paper punched for use with the feeding device illustrated in Fig. 9.

18 is a detail view of the adjustable drive mechanism for such auxiliary feeding device. Figs. 19 and 20 are perspective views of the paper strips which have been partially cross-cut during the initial imprinting operations preparatory to being passed through the present apparatus, whereby the severance of marginal strips containing feed holes will automatically effect division of the strip into successive sheets. Fig. 19 discloses a succession of closely spaced marginal holes, while Fig. 20 shows more widely spaced marginal holes, one in each succeeding form. Fig. 21 is a perspective view of a supply packet of a zig-zag folded material, which may be substituted for a supply roll.

Like parts are indicated by similar characters of reference throughout the several views.

The apparatus forming the subject matter hereof, as illustrated in the drawings, is mounted upon and between parallel side frames 1—1 mounted upon a base 2 and interconnected at spaced intervals by suitable tie bars.

The web of continuous series-connected stationery is supplied from a roll 3 journaled on the frame 1 at one end of the apparatus from which the web passes over a guide roll 4, thence over a guide table 5 and between the printing cylinder 6 and a coacting platen 7 having operating contact through a suitable opening in the table.

Beyond the printing cylinder the web passes beneath a signature imprinting roll 8, which may, however, be employed for other printing impressions in differently colored ink or in locations upon the web outside the impression area of the printing cylinder 6. Continuing its course over the table 5, the marginally punched web is engaged by pin wheel feed devices 9 by which the web is positively advanced through successive movements proportionate to the length of the finished sheets, the extent of which is variable at will.

The impression contact of the printing area of the rotating cylinder 6 with the paper against the platen roll 7 would ordinarily be sufficient to insure unison travel of separate sheets of paper web when properly fed so long as the impression contact is maintained on a single form. It is desired, however, to advance a paper web drawn from a roll of continuous forms, a selected predetermined distance at each operation sufficiently to compensate for the portion of the sheet occupied by the letterhead and a suitable space at the end and preceding the imprinted matter to afford to the printed letter or form a presentable balanced appearance and uniform length. This feeding motion of the paper web therefore varies in extent according with the size of the ultimate printed sheet, the extent of the letterhead area and that used for "balancing" the imprint material on the sheet. Any slight differentials or error of the feeding movement which would be quite unnoticeable on sheets singly fed, would be accumulative on continuous web material, and after a few impressions such differential would become quite serious.

In order to secure accurate registry upon succeeding sheets, it is therefore necessary that the advance of the material intermediate the impression periods be quite accurately effected. Hence the use of positive pin wheel feed devices 9 is preferred.

After having served its purpose of accurately and uniformly feeding the paper web, the punched margins thereof are trimmed off by being passed under rotary cutters 10, and finally the printed web, minus its punched margins, is transversely divided at regularly spaced intervals by a "chopper" type of cutter 11.

Power is applied through the main drive shaft 12 (beneath the printing cylinder) which carries a gear pinion 13 meshing with a corresponding pinion 14 upon the platen roll 7. The platen roll pinion meshes with a large gear wheel 15 fixedly connected to the printing cylinder 6 and rotating in unison therewith. The printing cylinder is thus given continuous rotary motion, always in the same direction. The printing cylinder gear 15, operating through a gear pinion 16, drives a gear 17 upon a transverse shaft 18, which at the opposite side of the apparatus carries a rotary cam 19. The cam 19, operating through a pitman 20 having a roller 21 traveling in the cam slot 22, oscillates to and fro a pivoted gear sector 23. The gear sector 23 intermeshes with a small gear pinion 24 loose upon the printing cylinder shaft 25 and connected through a friction clutch 26 with an oscillating disc 27, also loosely journaled upon the printing cylinder shaft 25 for free to and fro oscillation. The oscillatory disc 27 is peripherally grooved to receive relatively adjustable stops 28, of which there are two, slidingly adjustable in the peripheral groove and are adapted to be locked in their adjusted positions. The periphery of the disc is preferably, though not necessarily, serrated to receive and hold the stop lugs 28, which are similarly serrated for interlocking engagement. These stop lugs 28 contact with limiting stops 30 and 31 respectively upon the frame of the apparatus at the limit of the oscillatory movement of the disc in either direction. The extent of such oscillatory motion is determined by the relative positions of the adjustable stop lugs 28. The engagement of such lugs with the fixed stops 30 and 31 limits the oscillation of the disc and any differential movement of the actuating gear sector 23 is compensated for by slippage of the friction clutch 26. Thus, while the actuating gear sector describes a full stroke motion at each operation, the disc 27 moves in unison therewith through a portion only of such stroke until arrested by engagement of one or the other pair of stop lugs, whereupon the gear sector 23 continues its movement rotating the gear pinion 24 idly by slipping the clutch 26.

The oscillatory disc carries a pawl 32 at its inner side, engaging with a ratchet wheel 33 also loosely journaled upon the printing cylinder shaft 25, with which is fixedly connected for unison rotation a large gear wheel 34 substantially equal in size to the printing cylinder gear 15 at the opposite side of the apparatus. Due to the interposed pawl and ratchet driving connection 32–33, the large gear wheel 34 is intermittently rotated in unison with the oscillation of the disc 27 and gear sector 23 in one direction, but remains at rest in its advanced position during retrograde movement of such parts. The degree of motion transmitted to the gear wheel 34 at each actuating movement is determined by the relative spacing of the limiting stops 28 upon the oscillatory disc. Thus the continuous motion of the driving mechanism is transformed into intermittent motion of the paper feed devices, the extent of which may be varied to accommodate letters, bills or forms of different length.

The intermittently operated gear wheel 34 is operatively connected through a train of idler gears 35, 36, 37, 38, 39, and 40 with a gear wheel 41 upon a shaft 42 carrying the pin wheel feed devices 9 to which intermittent motion is thus transmitted. By this means the paper web is advanced uniformly with the rotation of the printing cylinder while the printing form is in contact therewith, and is further advanced in unison with the rotation of the cylinder either before or after the engagement therewith of the printing form, but such unison movement is not continuous and the paper web comes to rest while the cylinder continues to rotate to present the type form in position for the succeeding printing impression upon the web.

The peripheral pins of the pin wheel feed devices 9 project through registering slots in the feed table 5 into feeding engagement with the marginal holes in the paper web. The feed table is preferably divided and the section contiguous to the pin wheels is pivotally mounted to afford access to such wheels. The web is maintained in feeding engagement with the pins by an overlying keeper plate 43, which is slotted at 44 for the passage of the feeding pins in their rotary travel. The keeper plate 43 is carried upon swinging arms 45 pivoted at 46, one of which is provided with a peripherally notched head 47 for engagement of a detent 48 by which the keeper plate is supported in slightly elevated relation above the feeding table 5 to minimize friction. The pivotal mounting of the keeper plate enables it to be turned to an inoperative position to facilitate insertion and initial adjustment of the paper web upon the pin wheels 9.

Located beyond the feeding wheels 9 are parallel spaced trimming discs 10 cooperating with a platen roller 50, between which the paper web advances, and by which the punched margins of the web are simultaneously trimmed off. The cutters or trimming discs 10 are adjustably mounted on swinging arms 51 and adjusted relative to the platen roll by the adjusting screw 52. Idler rollers 49 are mounted adjacent to the trimming discs 10 and hold the paper web on the platen 50.

Finally the advancing paper web is engaged by a transverse cutter, by which it is divided at spaced intervals into succeeding separate sheets, each of which bears the imprint of the type or marking devices carried by the printing cylinder in accurately predetermined position upon the sheet, which may also bear a previously printed letter-head or other data or indicia.

The transverse cutter may be of various forms. A quite simple construction consists of a stationary cutter bar 53 mounted upon the main frame, with which cooperates a sweep 54 carrying a coacting transverse cutter bar 11. Such sweep arms are adjustably carried upon the revoluble shaft 56 upon which is mounted a driven gear 57, to which motion is transmitted by idler gears 58 and 49 forming a continuation of the gear train operating the pin wheel feed devices. Being operated through the same driving train, the cutter functions in timed relation with the web feeding devices. Sheets of different length are accommodated by adjusting the sweep arms to different radial positions about the shaft, thereby changing the timed relation of the cutter knife.

The preferred form of cutter comprises a head 60 slidingly mounted upon guide rods 61 supported in a cross bar 62 of the main frame and projecting longitudinally therebeyond. The guide rods are preferably provided with rack teeth 63 for engagement of pinions carried by the head and rotatable by the crank 64 to slidingly adjust the cutter head. Mounted in the cutter head 60 is a vertically sliding knife bar 65 carrying a cutter blade 66, the cutting edge of which is upturned for cooperation with a second knife 67 stationarily carried upon the head 60. The paper web is progressively advanced between such knives. The sliding knife bar 65 is normally held retracted by a spring 68 and is guided between the rear side of the head 60 and an adjustable bearing or guide plate 69 mounted upon the head. The movable knife 66 has an upwardly projecting guide or lead finger 70 overlapping the end of the stationary knife 67 to insure proper sliding relation therebetween.

The sliding knife 66 is actuated against the tension of its retracting spring by a pivoted lever plate 71 engaging with a stud 72 on the knife bar 65 and in turn oscillated by a bell crank lever 73. The bell crank lever is connected by a link 74 with a rock arm 75 slidingly adjustable on a rock shaft 76 extending longitudinally of the machine. At its opposite end the rock shaft carries a similar rock arm 77, connected by a similar link with a small cam arm 78, which is engaged by a roller stud upon the cam 19' at each rotation of the cam which actuates the gear sector 23, thereby transmitting to the shaft 76 intermittent rocking motion. The shaft and rock arm 75 are splined for relative adjustment longitudinally of the shaft in unison with the adjustment of the cutter head 60, as may be necessary to accommodate sheets of different sizes. The links 74 are provided with double pivotal or universal joints to enable them to compensate for rocking motion of the respective connected arms in different planes.

While the pin wheel feed devices 9, before described, are preferred for intermittently advancing the paper web, in lieu thereof enlarged pin wheels 79 may be mounted concentrically with the printing cylinder upon the cylinder shaft 25 and connected with the intermittently operated gear wheel 34 for unison rotation. In such case one such enlarged pin wheel is provided at each side of the printing cylinder. These pin wheels are interconnected for unison rotation with the intermittently actuated large gear 34. If such enlarged pin wheel feed devices are employed, the smaller pin wheels 9 before described are omitted, and vice versa.

Figures 6, 7:
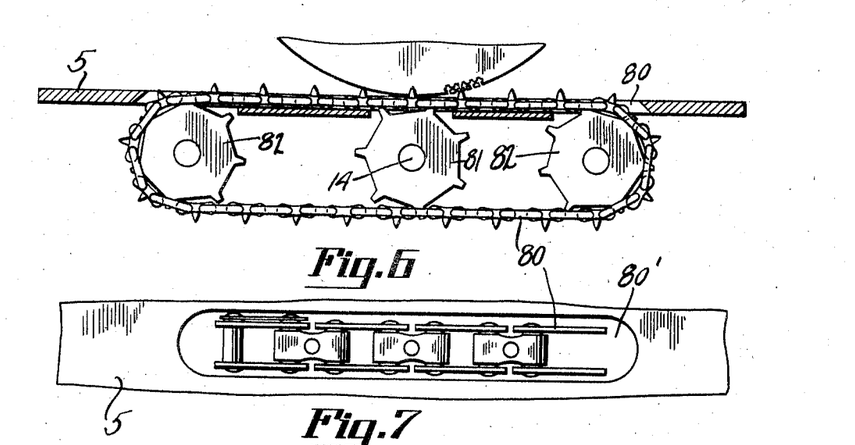
Figures 8, 12:
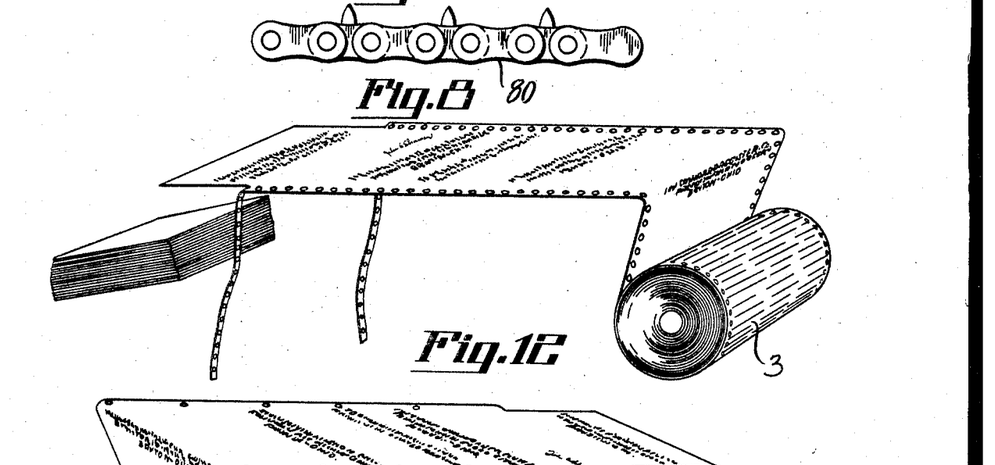

As a further modification, chain belts 80 shown in Figs. 6, 7 and 8 may be substituted for the pin wheels 9. In such case the traveling chain belt may be located at the present position of the pin wheels 9, but is preferably located immediately beneath the printing cylinder. In such position it is actuated by sprockets 81 upon the platen roll shaft 14 immediately beneath the cylinder. The studded feeding chain is guided over idler sprockets 82 located in spaced relation on opposite sides of the actuating sprocket 81. The feeding table is slotted at 80' to accommodate the feeding chains 80, the studs of which engage marginal holes punched in the paper web. By use of the chain the marginal feeding holes may be located at greater distances apart.

Figure 1:
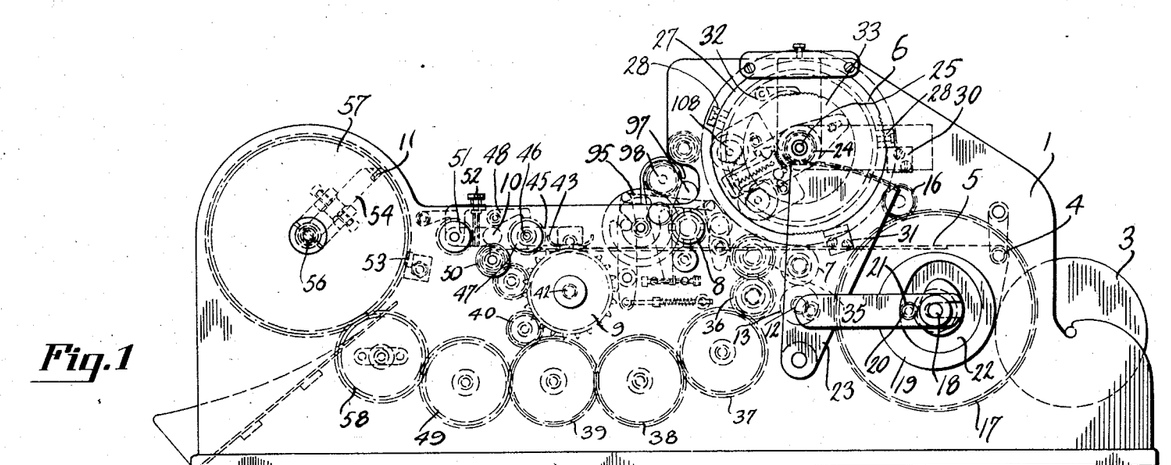
Fig. 1 is a side elevation of the assembled apparatus.
Figure 2:
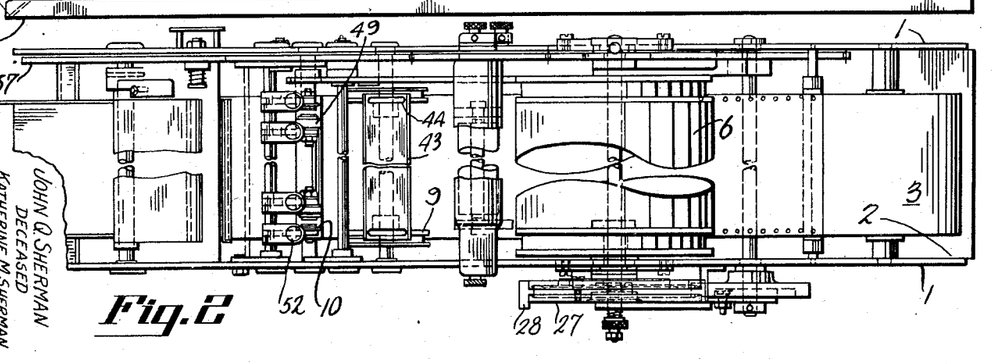
Fig. 2 is a top plan view thereof.
Figures 3, 10, 11:
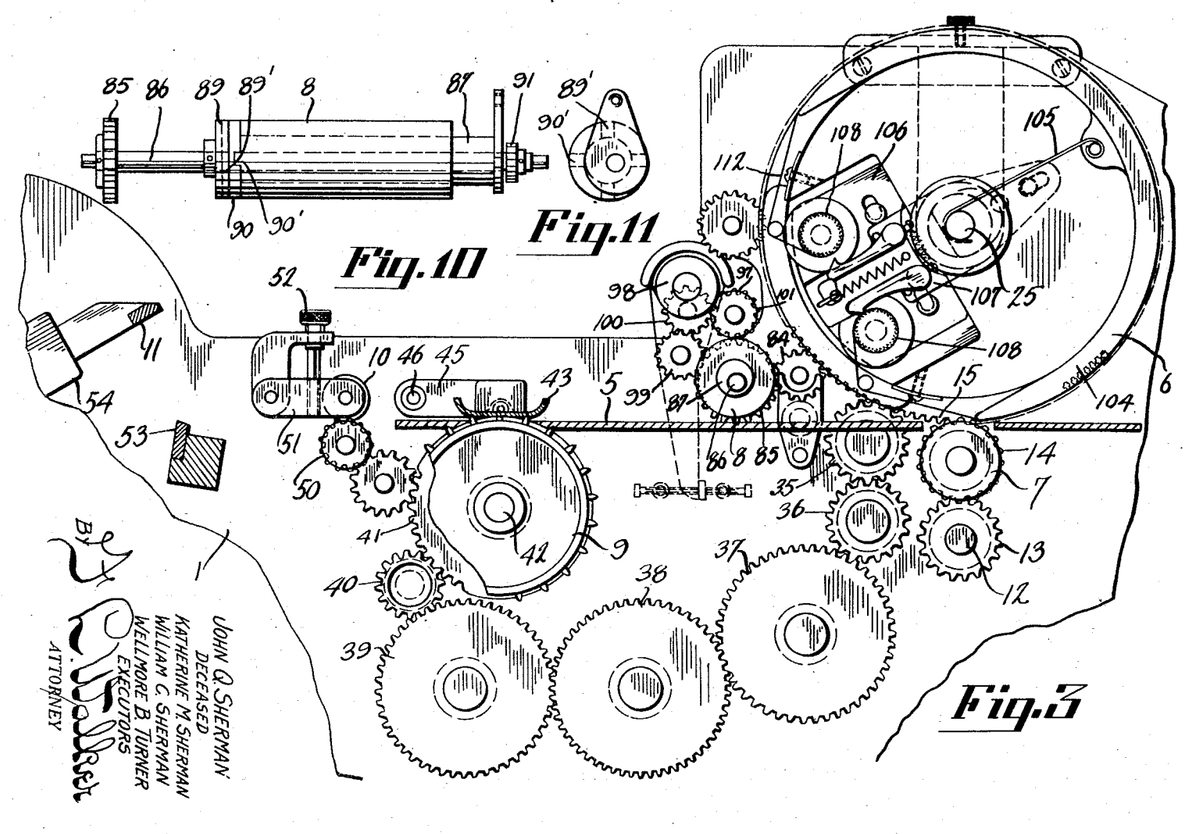
Fig. 3 is an enlarged detail sectional view on the longitudinal medial line looking upwardly in Fig. 2.
Figs. 10 and 11 are detail views of the auxiliary or signature-printing roller.
Figures 4, 9, 16:
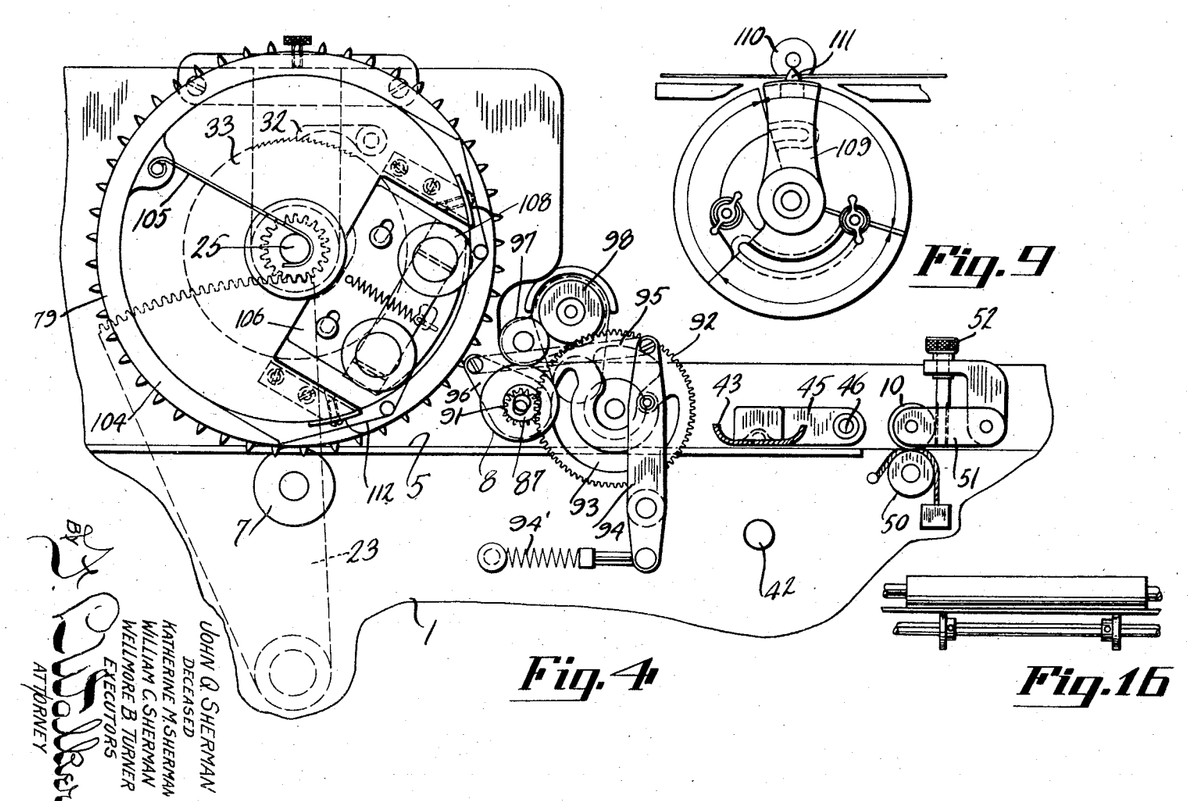
Fig. 4 is a similar enlarged detail sectional view looking in the reverse direction.
Fig. 9 is a detail view of a further modification of the paper feeding means.
Fig. 16 is a detail of a modified feeding device.
Figure 5:
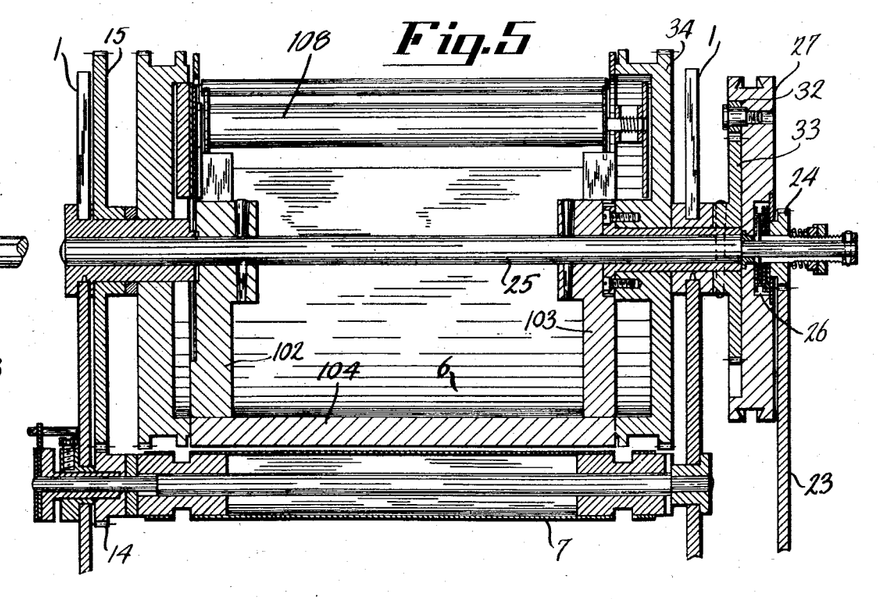
Fig. 5 is a transverse sectional view in the axial plane of the printing cylinder.
Figure 5A:
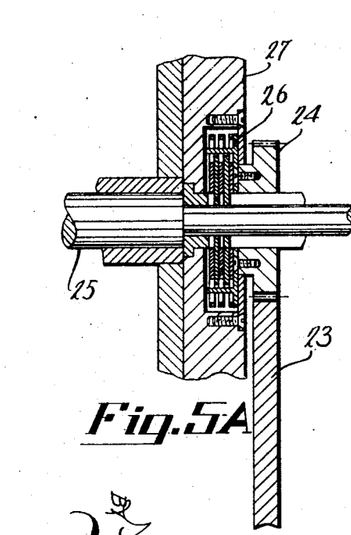
Fig. 5a is an enlarged view showing the driving connection between the printing cylinder actuating means and the printing cylinder.

In Fig. 9 there is shown a friction feed mechanism comprising a series of relatively adjustable overlapping sectors 109 which cooperate with a friction roll 110 to advance the paper web, the extent of advance being determined by the adjustment of the sectors. By relatively adjusting the sectors and securing them in such adjusted positions, the periphery of the feeding device may be extended or contracted. The paper is advanced by being frictionally engaged between the periphery of the sectors of the feeding device and the coacting friction roll. A single stud or feeding pin 111 carried by one of the sectors operatively engages in spaced feeding holes in the paper to insure the initiation of advance movement in proper time with the printing devices. This feeding means is shown and described in patent to Sherman No. 1,529,555, and, per se, forms no part of the present invention except in combination with associated parts.

In printing form letters it is quite desirable to imprint a facsimile signature in differently colored ink, or it is sometimes desirable for emphasis to print "fill-ins" of different color. For this purpose there is provided an auxiliary printing mechanism.

The continuously rotating cylinder gear 15 intermeshes with an idler pinion 84 transmitting motion to a gear 85 upon a transverse shaft 86, upon which is mounted for rocking motion an eccentric sleeve 87. Journaled upon the eccentric sleeve 87 is the auxiliary printing roller 8, bearing impression plates or type as may be required. The printing roller is operatively connected with the drive shaft 86 for unison rotation by compensating coupling heads 89—90. The head 89 is fast upon the shaft 86 and has in its lateral face diametrically opposite radial slots 89' within which engage splines or lugs on the floating collar 90, which also is provided with similar diametrically opposite radial slots 90' disposed in right angle relation with the slots 89' of the fixed collar 89. The radial slots of the floating collar are engaged by splines or lugs upon the end of the printing roller 8 to rotate such roller about the stationary eccentric sleeve 87. The eccentricity of the driving and driven rotating members is compensated for by a lateral shifting adjustment of the floating collar 90 relative to the fixed collar 89 and the roll 8 with both of which it is slidingly engaged for transverse motion, the motion relative to the respective members being at right angles.

The eccentric sleeve 87 is normally so positioned that the roller rotates in an elevated idle position above the level of the paper. By rocking the eccentric sleeve 87 about the drive shaft 86, the roller is lowered into impression contact with the paper web, without, however, interfering with its rotation. To rock the eccentric sleeve in proper timed relation, there is provided on the end of the shaft 86, opposite the driving gear 85, a small gear pinion 91 intermeshing with a gear wheel 92 having therein a cam groove 93 within which engages a roller upon an oscillatory lever 94 operable against the tension of a retracting spring 94'. The cam is so shaped that the lever is held stationary first in one position and then in another position while the gear and cam continue to rotate. The cam is so shaped that the lever is held in one position through a much greater time interval than in its other position. The lever 94 is connected by a link 95 with a rock arm 96 upon the eccentric sleeve 86. As the lever 94 is oscillated from its normal position to its operated position, in which it is temporarily held by the cam, it actuates the rock arm 96, thereby turning the eccentric sleeve to lower the printing roller into impression making contact with the paper web.

The gear train is so proportioned that the printing roller may make several rotations in its inoperative position before being lowered into impression making contact by actuation of the lever 94 and makes but one rotation therein before being returned. The printing roller is supplied with ink from a roller pad 97 by a transfer roller 98 driven through the gear pinion 99—100 and 101 from the auxiliary printing roller shaft 86.

The printing cylinder is preferably, though not necessarily, of the type commonly employed for multigraphing purposes. It consists of spaced heads 102 and 103 upon which is removably mounted a semi-circuar slotted type chase 104 within the slots of which the printing type are assembled. The chase is held upon the heads by a hook 105 having locking engagement with the cylinder shaft 25. The respective heads 102 and 103 carry mounting means 106 and automatic feeding mechanism 107 for supply and receiving rollers 108, upon which is carried an ink ribbon or apron 112 extending around the periphery of the cylinder and over the type body or printing plate. The impression is effected through such inked apron in the manner well known in duplicating apparatus. It is obvious, however, that the type may be inked by an ink transfer roll receiving its supply from a roller pad or from an ink fountain as is customary in printing apparatus and as shown in association with the auxiliary or signature printing roller. The particular detail construction of the type chase and ink ribbon or apron feeding mechanism forms no part, per se, of the present invention.

The use of the present apparatus enables the rapid, accurate and economical production of multi-form letters, circulars and other printing operations. By employing stationery pre-printed in roll form, a great saving in material and printing costs is effected. The present apparatus accurately positions its impressions with the prior imprints upon the roll material and the positive paper feeding means automatically and continuously maintains such relation. The work can be performed more rapidly and less expensively than is possible with the usual more expensive duplicating machines requiring feeders for flat forms.

While the printing of successive impressions upon continuous web material is quite common, ordinarily a slight variation in the spacing of successive impressions is quite immaterial. The present material being pre-printed with letter headings, forms or other indicia, in definite relation with which additional imprints are to be made by the present apparatus, any variation, however slight, in the feeding of the web relative to the printing apparatus results in defective production. Hence positive feeding devices are employed to insure accurate registry which would otherwise be unnecessary if printing upon blank webs. Likewise the letterheads, forms or other matter pre-printed upon the web must be accurately spaced.

In order that the synchronized feeding and imprinting mechanism may be relieved of tension and pulling strain incident to withdrawing the material from a heavy supply roll 3, an auxiliary pin type roller 115 may be provided above the supply roll 3, the pins 116 of which have progressive engagement with the marginally punched holes in the strip of material. This pin type roller is actuated from the drive gear 17 by a variable frictional drive mechanism.

Figures 18, 19:
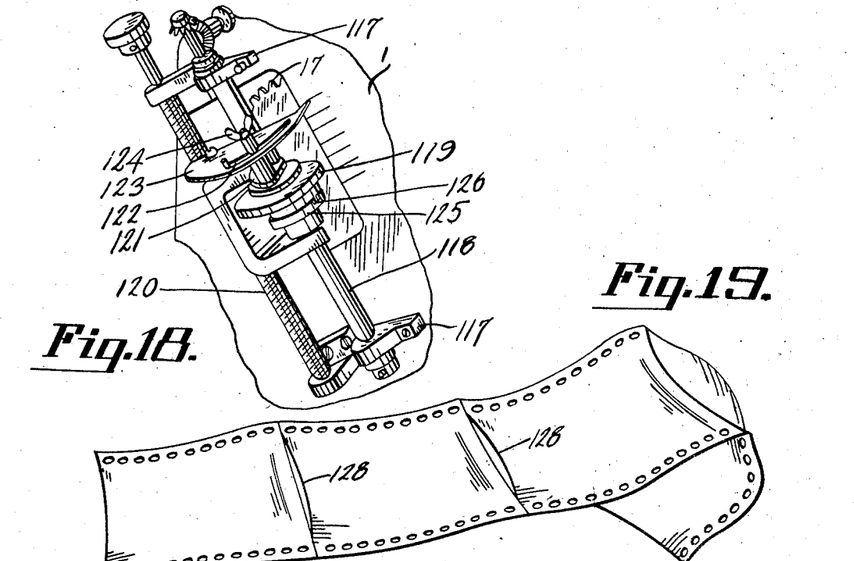

As shown in Figs. 18 and 19, there is journaled in brackets 117 upon the side frame 1 of the apparatus a revoluble shaft 118, having at its upper end a bevel gear pinion meshing with a corresponding gear pinion on the shaft of the roller 115. A friction wheel 119 having driving engagement with the shaft 118 projects through an opening in the side frame 1 into engagement with the driving gear 17. The friction wheel and its mounting are adjustable longitudinally of the shaft and radially toward and from the center of the gear 17 by an adjusting screw 120. To enable adjustment of the friction wheel toward the gear 17 to compensate for wear and maintain requisite driving pressure, the wheel 119 is loosely journaled upon an eccentric bushing surrounding the shaft. The bushing is revolubly adjustable thereon by means of an adjusting lever 121 operative in an arcuate slot 122 of a segment plate 123 carried by the wheel mounting. A nut 124 serves to hold the bushing in its adjusted position. The friction wheel thus rotates about an axis somewhat eccentric with that of the shaft 118. Secured to the shaft immediately beneath the wheel for unison rotation is a disc-like collar 125, having therein a radial slot 126 into which projects a driving stud carried by the wheel. Thus the disc 125 and shaft 118 are rotated in unison with the eccentrically positioned friction wheel.

While the strip feeding mechanism synchronized with the imprinting means is intermittently actuated, the auxiliary feeding roller 115 is continuously driven to draw from the roll a supply of material which droops in a loose bight or loop 127 intermediate the auxiliary feeding roller and the imprinting devices and associated synchronized feeding means. The speed of the auxiliary roller is timed, by adjustment of the friction wheel, to maintain ample slack or excess material in the loop 137, from which the material passes to the imprinting and feeding apparatus.

Figure 13:
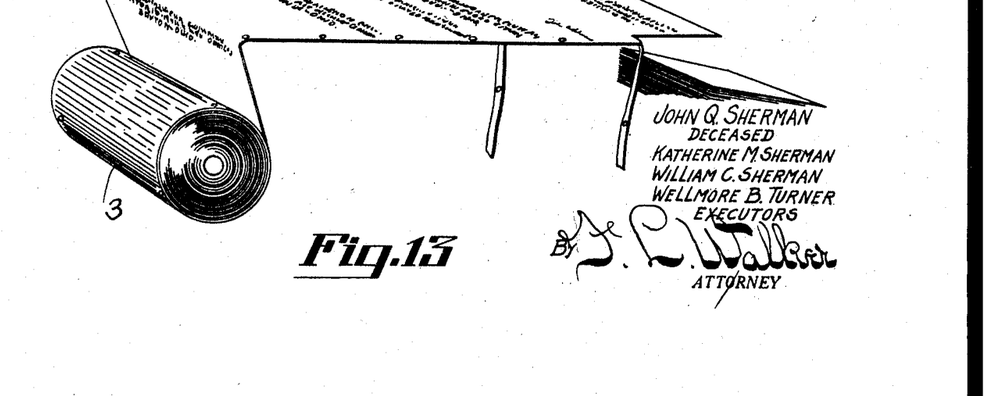
Figure 14:
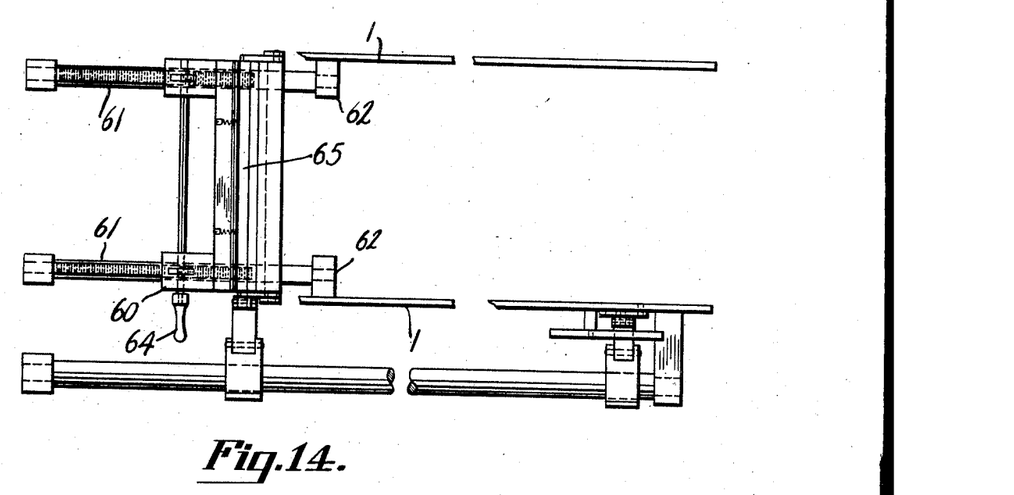
Figs. 14 and 15 are top plan and side elevations of the adjustable cut-off mechanism.
Figure 15:
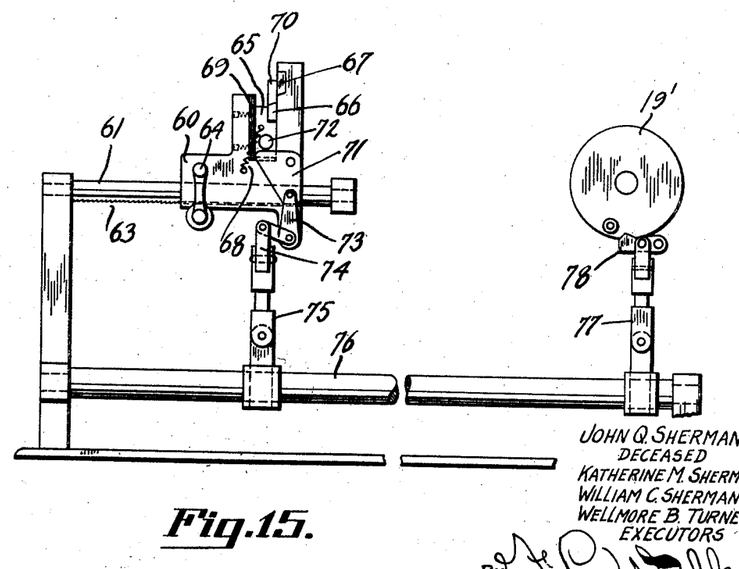
Figure 17:
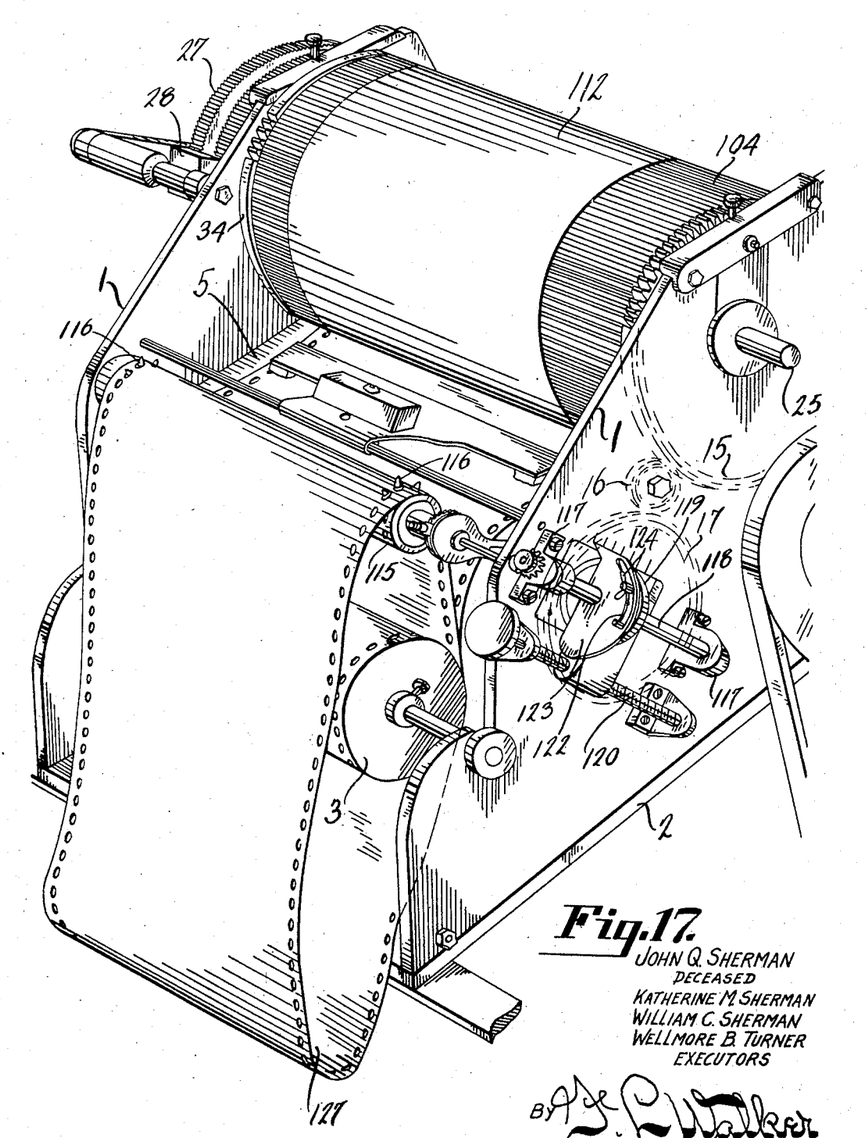
Fig. 17 is a perspective view of an auxiliary paper supply mechanism for relieving the feeding and imprinting mechanism of the tension strain of drawing the material from the supply roll. Fig.
Figures 20, 21:
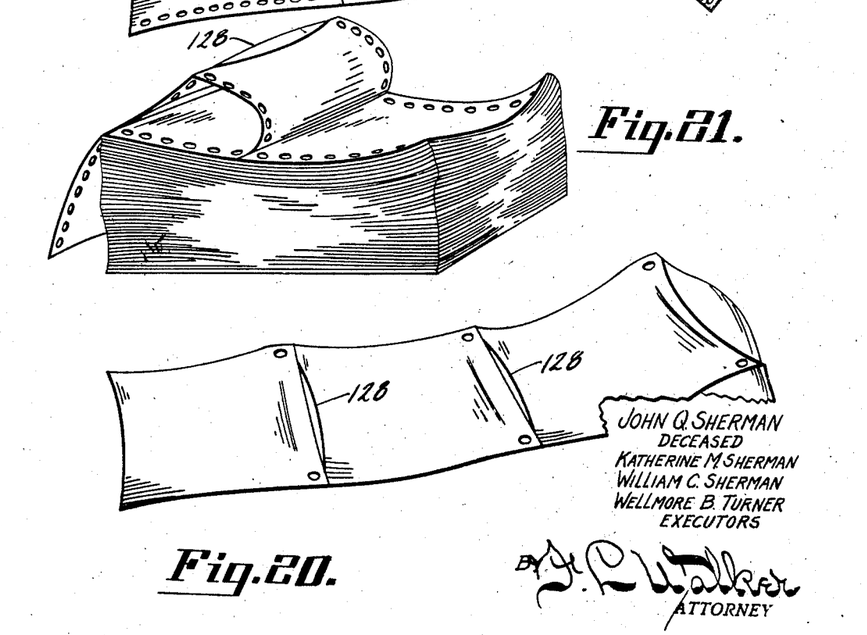

While, as before described, the material may be transversely severed into succeeding sheets by a cutter operating in synchronism with the imprinting and feeding apparatus, such cutter may be omitted and the strip of material may be partially severed at spaced intervals before being fed to the present apparatus. In Figs. 20 and 21 the strip material is shown as comprising a succession of sheets interconnected only contiguous to their side margins. Between each succeeding form or sheet is a transverse cut 128 which terminates in spaced relation with the side edges. After the strip has passed through the machine, its engagement with the trimmers will detach such marginal strips on lines intersecting the cross-cuts substantially coincident with the ends thereof, thus freeing succeeding forms or sheets from each other. Although a continuous succession of spaced holes are preferably provided in the margins of the strip material as shown in Fig. 20, a lesser number of more widely spaced feed holes may be provided as shown in Fig. 21. Whether cross cut between succeeding forms as shown in Figs. 20 and 21, or continuous as shown in Figs. 12, 13 and 18, the material may be reversely folded into packet form, preferably at spaced intervals, coincident with the lines upon which the material is to be subsequently severed, as shown in Fig. 22.

It is to be noted that during successive contact pressure engagements of the strip of material between the imprinting drum 6 and platen roller 7, which ordinarily continues throughout a portion only of the rotation of the drum 6, the strip is subject to intermittent frictional feeding impulses, and that the pin wheel 9, located in offset relation with the frictional feeding members 6 and 7, in the direction of advancement of the strip, maintains continuous feeding engagement with the strip to continue advancement of the strip intermediate succeeding intervals of frictional feeding influence by the rollers 6 and 7. Thus the intermittent frictional feeding operations of the rollers 6 and 7 alternate with positive pin type feeding operations of the pin wheel 9 which occur independently of the feeding influence of the rollers 6 and 7. During a portion of each cycle of operation the strip is subjected to simultaneous frictional and positive pin type feeding operations and during the remainder of the cycle of operation, intermediate succeeding frictional feeding operations, the strip is subject to only positive pin type feeding operation.

The present arrangement of parts and control of the feeding and imprinting means enables the use of printing plates of different length, and hence, engageable through greater or less portions of the cycle, the positive feeding means is adjustable for different lengths of forms and does not operate continuously at the same rate of speed as the printing cylinder. Obviously, during such period as the printing cylinder is in contact with the web to which it imparts a simultaneous frictional feeding impulse, the feeding means must be synchronized therewith, but during the intervening intervals the feeding device may be differentially operated, either at a reduced or increased speed or it may be operative during a portion of the intervening interval between succeeding impressions and at rest during the remainder of the intervals. The necessary extent of feeding movement is that portion of the form upon which the imprinting device operates plus sufficient additional movement necessary to advance the web during non-printing intervals to present the succeeding impression receiving area in position for engagement of the imprinting device.

The present application is a division of copending application Serial No. 115,804, now matured into Letters Patent No. 2,177,675, wherein the subject matter of the appended claims is shown and described but not claimed. Cross reference is made to copending companion applications Serial No. 116,552, filed December 18, 1936; Serial No. 226,760, filed August 25, 1938; and Serial No. 279,341, filed June 15, 1939.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described the invention, it is claimed:

1. An apparatus of the type wherein a continuous strip of record material having thereon a longitudinally spaced succession of imprinted areas, and having therein a longitudinal succession of marginal feed holes disposed in predetermined identical relation with the succession of imprinted areas and lines of severance intermediate succeeding imprinted areas, is intermittently advanced past strip trimming and severing devices by which the marginal feed holes are progressively removed and the remainder of the strip transversely divided in predetermined definite relation with the imprinted areas into a succession of individual imprinted sheets, characterized by a traveling pin type feeding device having progressive engagement in the marginal holes in the strip to advance the strip a predetermined distance at each operation, trimming means for longitudinally separating from the strip at least one marginally punched area thereof, and strip severing means operative in synchronism with the feeding means for detaching succeeding terminal portions of predetermined length from the strip, and actuating means for operating the strip feeding means, and the strip severing means in alternating sequence.

2. An apparatus of the type wherein a continuous strip of record material having thereon a longitudinally spaced succession of imprinted areas, and having therein a longitudinal succession of marginal feed holes disposed in predetermined identical relation with the succession of imprinted areas and lines of severance intermediate succeeding imprinted areas, is intermittently advanced past strip trimming and severing devices by which the marginal feed holes are progressively removed and the remainder of the strip transversely divided in predetermined definite relation with the imprinted areas into a succession of individual imprinted sheets, characterized by a pin type feeding device having progressive engagement with a marginally punched area of the strip to advance the strip measured distances at each operation, a strip severing device operative in alternation with the strip feeding device for transversely dividing the strip at predetermined longitudinally spaced intervals commensurate with the advancement of the strip by operation of the feeding device, and a strip trimming device operative simultaneously with the advancement of the strip for removing therefrom a punched marginal area thereof.

3. An apparatus of the type wherein a continuous strip of record material having thereon a longitudinally spaced succession of imprinted areas, and having therein a longitudinal succession of marginal feed holes disposed in predetermined identical relation with the succession of imprinted areas and lines of severance intermediate succeeding imprinted areas, is intermittently advanced through a step-by-step travel movement past strip trimming and severing devices by which the marginal feed holes are progressively removed and the remainder of the strip transversely divided in predetermined definite relation with the imprinted areas into a succession of individual imprinted sheets, characterized by a pin type feeding device having progressive engagement with the marginal holes to intermittently advance the strip through succeeding measured distances, a strip severing device operative alternately with the feeding device to transversely sever the strip at predetermined intervals into a succession of individual sheets, adjusting means for varying the distance the strip is advanced at each operation of the feeding device to thereby vary the length of the severed sheets, and means for progressively trimming the successive portions of the strip detached therefrom.

4. An apparatus of the type wherein a continuous strip of record material having thereon a longitudinally spaced succession of imprinted areas, and having therein a longitudinal succession of marginal feed holes disposed in predetermined identical relation with the succession of imprinted areas and lines of severance intermediate succeeding imprinted areas, is intermittently advanced through a step-by-step travel movement past strip trimming and severing devices by which the marginal feed holes are progressively removed and the remainder of the strip transversely divided in predetermined definite relation with the imprinted areas into a succession of individual imprinted sheets, characterized by a pin type feeding device having progressive engagement with the marginal holes to intermittently advance the strip through succeeding measured distances, means for varying at will the extent of advance movement of the strip at each operation of the feeding device, a strip severing device operative alternately with the operation of the strip feeding device for progressively detaching succeeding terminal portions of uniform length therefrom, and a strip trimming device operative simultaneously with the operation of the feeding device for progressively detaching from the strip the punched marginal area thereof subsequent to its engagement by the pin type feeding device and prior to engagement of the severing device with the strip.

5. An apparatus of the type wherein a continuous strip of record material having thereon a longitudinally spaced succession of imprinted areas, and having therein a longitudinal succession of marginal feed holes disposed in predetermined identical relation with the succession of imprinted areas, is intermittently advanced past strip trimming and severing devices by which the marginal feed holes are progressively removed and the remainder of the strip transversely divided in predetermined definite relation with the imprinted areas into a succession of individual imprinted sheets, characterized by a pin type feeding device having progressive engagement in the longitudinally spaced marginal holes for advancing the strip, means for intermittently actuating the pin type feed device for advancing the strip through a step-by-step movement predetermined distances at each operation, shear discs past which the strip is advanced by the pin type feeding device for marginally trimming the strip of material and a pair of coacting transversely disposed shear blades operative to remove from the strip succeeding terminal portions thereof, into severing relation with which the strip is advanced by the feeding device.

6. An apparatus of the type wherein a continuous strip of record material having thereon a longitudinally spaced succession of imprinted areas, and having therein a longitudinal succession of marginal feed holes disposed in predetermined identical relation with the succession of imprinted areas, is intermittently advanced past strip trimming and severing devices by which the marginal feed holes are progressively removed and the remainder of the strip transversely divided in predetermined definite relation with the imprinted areas into a succession of individual imprinted sheets, characterized by a pin type feeding device having progressive engagement in the longitudinally spaced marginal holes for advancing the strip, a trimming device past which the strip is advanced by the pin type feeding device for removing a marginal portion therefrom, and a pair of coacting transversely disposed shear blades, into severing relation with which the strip is advanced by the feeding device, and actuating means for operating the feeding, trimming and severing devices in timed relation.

7. An apparatus of the type wherein a continuous strip of record material having thereon a longitudinally spaced succession of imprinted areas is intermittently advanced past strip severing devices by which the strip is transversely divided in predetermined definite relation with the imprinted areas into a succession of individual imprinted sheets, characterized by a strip feeding device for intermittently advancing the continuous strip of material through successive predetermined degrees of movement, a strip severing device into severing relation with which succeeding terminal portions of the strip are advanced, means for actuating the strip feeding and strip severing devices in alternating sequence, and variable means for effecting advancement of the strip through degrees of movement greater or less extent to change the size of the severed portions thereof.

8. An apparatus of the type wherein a continuous strip of record material having thereon a longitudinally spaced succession of imprinted areas is intermittently advanced past strip severing devices by which the strip is transversely divided in predetermined definite relation with the imprinted areas into a succession of individual imprinted sheets, characterized by a strip feeding device engageable with the continuous strip of material for advancing the strip succeeding measured distances and arresting the strip at the end of each advancement, a strip severing device into severing relation with which succeeding terminal portions of the strip are advanced by the feeding device, actuating means for operating the feeding device and strip severing device alternately, and variable control means for regulating the degree of advancement of the strip by the feeding device to enable advancement thereof greater or less distances intermediate succeeding operations of the severing device.

9. An apparatus of the type wherein a continuous strip of record material having thereon a longitudinally spaced succession of imprinted areas is intermittently advanced past strip severing devices by which the strip is transversely divided in predetermined definite relation with the imprinted areas into a succession of individual imprinted sheets, characterized by a strip feeding device engageable with the continuous strip of material for advancing the strip succeeding measured distances and arresting the strip at the end of each advancement, a strip severing device into severing relation with which succeeding terminal portions of the strip are advanced by the feeding device, actuating means for operating the feeding device and strip severing device alternately, and variable control means for regulating the feeding period of the strip feeding device, by which it is rendered operative through greater or less time periods to advance the strip greater or less distances intermediate succeeding operations of the severing device.

10. An apparatus of the type wherein a continuous strip of record material having thereon a longitudinally spaced succession of imprinted areas is intermittently advanced past strip severing devices by which the strip is transversely divided in predetermined definite relation with the imprinted areas into a succession of individual imprinted sheets, characterized by a strip feeding device engageable with the continuous strip of material for advancing the strip succeeding measured distances and arresting the strip at the end of each advancement, a strip severing device into severing relation with which succeeding terminal portions of the strip are advanced by the feeding device, actuating means for operating the feeding device and strip severing device alternately, and variable control means for operating the strip feeding device through feeding movement of greater or less extent to advance the strip corresponding greater or less distances intermediate succeeding operations.

11. An apparatus of the type wherein a continuous strip of record material having thereon a longitudinally spaced succession of imprinted areas is intermittently advanced past strip trimming and severing devices by which a longitudinal marginal portion of the strip is progressively removed and the remainder of the strip transversely divided in predetermined definite relation with imprinted areas into a succession of individual imprinted sheets, characterized by a strip feeding device for intermittently advancing the continuous strip of material, a strip trimming device past which the strip is advanced by the strip feeding device and by which a longitudinal marginal portion of the strip is removed therefrom and strip severing means having intermittent engagement with succeeding advanced terminal portions of the strip for detaching succeeding portions of substantially uniform length therefrom, and actuating means for operating the several devices in continuous cycle.

12. In a strip feeding and severing apparatus, a positive strip feeding device having progressive engagement with longitudinally spaced configurations of a continuous strip of material, a strip trimming device past which the strip is advanced by the strip feeding device, and rotary means into operative relation with which the marginally trimmed portion of the strip is advanced, having periodic engagement therewith for severing from the trimmed portion of the strip successive terminal portions of approximately uniform size, and actuating means for operating the several devices in timed relation.

13. An apparatus of the type wherein a continuous strip of record material having thereon a longitudinally spaced succession of imprinted areas and a longitudinally spaced succession of marginal configurations disposed in predetermined identical relation with the succession of imprinted areas and lines of severance intermediate succeeding imprinted areas is advanced past strip trimming and severing position by which the marginal configurations are progressively removed and the remainder of the strip transversely divided in predetermined definite relation with the imprinted areas into a succession of individual imprinted sheets, characterized by a positive strip feeding device having progressive engagement with the longitudinally spaced configurations of a continuous strip of material, a strip trimming device past which the strip is advanced by the strip feeding device, and a shear knife movable in a direction substantially perpendicular to the plane of the strip at the moment of severance and operable in synchronism with the feeding device for severing from the trimmed portion of the strip succeeding terminal portions of approximately uniform size.

14. An apparatus of the type wherein a continuous strip of record material having thereon a longitudinally spaced succession of imprinted areas and a longitudinally spaced succession of marginal configurations disposed in predetermined identical relation with the succession of imprinted areas and lines of severance intermediate succeeding imprinted areas is advanced past strip trimming and severing position by which the marginal configurations are progressively removed and the remainder of the strip transversely divided in predetermined definite relation with the imprinted areas into a succession of individual imprinted sheets, characterized by a positive strip feeding device having progressive engagement with the longitudinally spaced configurations of a continuous strip of material, a strip trimming device past which the strip is advanced by the strip feeding device, a severing device intermittently engageable with the strip in synchronism with the operation of the feeding device for detaching from the strip succeeding terminal portions of substantially uniform size, and variable control mechanism for varying the operative action of the strip feeding device to correspondingly vary the size of the severed portions of the strip.

15. An apparatus of the type wherein a continuous strip of record material having thereon a longitudinally spaced succession of imprinted areas is progressively advanced past strip severing devices by which the strip is transversely divided in predetermined definite relation with the imprinted areas into a succession of individual imprinted sheets, characterized by a strip feeding device engageable with the strip for intermittently advancing the strip through a step-by-step movement past a severing position, a strip severing device for transversely dividing the strip at predetermined intervals, actuating means for operating the severing device in timed sequence with the advancement of the strip, the construction and arrangement being such that predetermined longitudinally spaced non-imprinted areas of the strip are accurately presented in registry with the severing position approximately simultaneously with the engagement of the severing device therewith.

16. An apparatus of the type wherein a continuous strip of record material having thereon a longitudinally spaced succession of imprinted areas is progressively advanced past a given position by a strip feeding device, and at which position the area of the strip with which the feeding device shall have been engaged is removed from the strip, characterized by a strip feeding device having progressive marginal engagement with the strip for intermittently advancing said strip through a step-by-step movement, and a coacting trimming device past which the strip is intermittently advanced by the strip feeding device having engagement with the strip, for progressively removing therefrom a marginal area of the strip with which the strip feeding device shall have been engaged.

17. An apparatus of the type wherein a continuous strip of record material having thereon a longitudinally spaced succession of imprinted areas is progressively advanced past a given position by a strip feeding device, and at which position the area of the strip with which the feeding device shall have been engaged is removed from the strip, characterized by a strip feeding device having intermittent feeding engagement with the strip and a severing device past which the strip is advanced by the strip feeding device and operative to remove therefrom succeeding portions of the strip with which the feeding device shall have been engaged.

18. An apparatus of the type wherein a continuous strip of record material having thereon a longitudinally spaced succession of imprinted areas is intermittently advanced past strip trimming and severing devices by which a longitudinal marginal portion of the strip is progressively removed and the remainder of the strip transversely divided in predetermined definite relation with imprinted areas into a succession of individual imprinted sheets, characterized by a strip feeding device having marginal engagement with succeeding divisible portions of the strip for intermittently advancing the strip through a step-by-step movement past a severing position, a severing device operative in timed sequence with the advancement of the strip for transversely severing succeeding portions of predetermined length therefrom, and a trimming device for removing from succeeding portions thereof the marginal portion with which the strip feeding device shall have been engaged.

19. In a strip feeding and registering mechanism, a pair of coacting rollers temporarily engageable with interposed strip material and effective to frictionally impart to the strip material intermittent feeding movement, a pin type feeding device located in offset relation with the rollers in the direction of advancement of the strip material and having continuous engagement in longitudinally spaced holes in the strip material and operative to further advance the strip material intermediate succeeding intervals of operative engagement of the rollers therewith and independently thereof to adjust the strip material preparatory to reengagement of the rollers therewith.

20. In a strip feeding and registering apparatus, dual feeding devices operative in unison for progressively advancing record material through succeeding prescribed degrees of advancement, one of the feeding devices being intermittently operative and the other of the feeding devices being operative independently of the first mentioned device intermediate successive periods of unison operation to adjust the material preparatory to further unison operation of the feeding devices.

21. In a strip feeding and registering apparatus, frictional feeding means intermittently engageable with record material and effective to advance the record material through succeeding movements thereof, and a positive means having continuous feeding engagement with the record material and periodically operative in unison with the frictional means for advancing the record material and effective independently of the frictional feeding means intermediate periods of unison feeding operation to adjust the record material preparatory to further unison feeding operation of said frictional and positive feeding devices.

22. In a strip feeding and registering apparatus, a pair of rollers having intermittent engagement with interposed record material to periodically advance the record material through succeeding travel movements, and a pin wheel disposed in offset relation with the rollers in the direction of travel of the record material having continuous engagement in marginally punched holes in the record material and operative to adjust the record material intermediate succeeding engagements of the rollers therewith preparatory to reengagement of the rollers with the record material.

23. In a strip feeding and registering apparatus, a pair of coacting rollers having intermittent frictional engagement with a strip to be fed and effective to frictionally advance the strip during periodic engagement of the rollers therewith, and a pin wheel feeding unit having continuous engagement in longitudinally spaced holes in the record strip and operative both during and intermediate successive periods of frictional engagement of the rollers with the strip to adjust the strip preparatory to reengagement of the rollers therewith.

KATHERINE M. SHERMAN,
WILLIAM C. SHERMAN,
WELLMORE B. TURNER,
Executors of the Estate of John Q. Sherman, Deceased.